US009217526B2

(12) United States Patent
Eccleston

(10) Patent No.: US 9,217,526 B2
(45) Date of Patent: Dec. 22, 2015

(54) TESTING AND VENTING PIPE ANNULUS

(75) Inventor: Tony Eccleston, Newcastle Upon Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 1428 days.

(21) Appl. No.: 12/447,643

(22) PCT Filed: Oct. 5, 2007

(86) PCT No.: PCT/GB2007/003778
§ 371 (c)(1),
(2), (4) Date: Apr. 28, 2009

(87) PCT Pub. No.: WO2008/053142
PCT Pub. Date: May 8, 2008

(65) Prior Publication Data
US 2010/0068986 A1 Mar. 18, 2010

(30) Foreign Application Priority Data
Oct. 30, 2006 (GB) .................................. 0621543.8

(51) Int. Cl.
F16L 11/00 (2006.01)
G01M 3/04 (2006.01)
F24F 7/00 (2006.01)
G01M 3/00 (2006.01)
F16L 23/00 (2006.01)
F16L 11/12 (2006.01)
(Continued)

(52) U.S. Cl.
CPC .............. *F16L 23/006* (2013.01); *F16L 11/12* (2013.01); *G01M 3/283* (2013.01); F16L 2011/047 (2013.01); F16L 2101/30 (2013.01)

(58) Field of Classification Search
CPC ... G01M 3/2807; G01M 3/283; F16L 23/006; F16L 11/12
USPC .............. 454/339; 138/137, 120; 73/40, 49.1, 73/49.8, 40.5 R, 432.1
See application file for complete search history.

(56) References Cited

U.S. PATENT DOCUMENTS 2,350,867 A * 6/1944 Bean et al. ...................... 285/96
2,940,778 A * 6/1960 Kaiser ............................ 285/95
(Continued)

FOREIGN PATENT DOCUMENTS

CN 15905089 A 3/2005
EP 0535997 4/1993
(Continued)

OTHER PUBLICATIONS

Cox, FR 2,545,186 English language machine translation, Nov. 2, 1984.*
(Continued)

*Primary Examiner* — Alissa Tompkins
*Assistant Examiner* — Phillip E Decker
(74) *Attorney, Agent, or Firm* — Klarquist Sparkman, LLP

(57) ABSTRACT

A method and apparatus are disclosed for testing the integrity of a portion of flexible pipe body. The method includes the steps of, via at least one port in an end fitting assembly in which an end of a portion of flexible pipe body is terminated, monitoring at least one parameter associated with an annulus region disposed between layers of the flexible pipe body, the annulus region being connected to the port by a connecting passageway.

13 Claims, 8 Drawing Sheets

Figure 1:
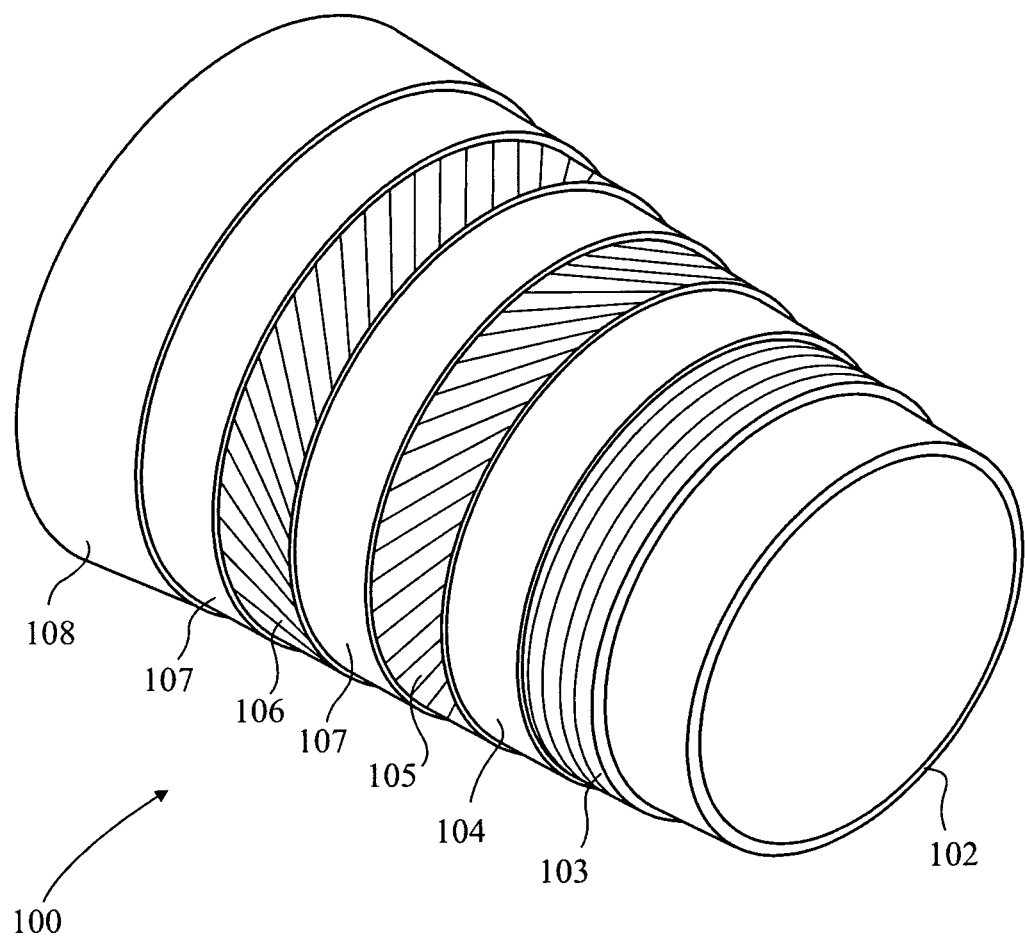

(51) Int. Cl.
*G01M 3/28* (2006.01)
*F16L 11/04* (2006.01)
*F16L 101/30* (2006.01)

(56) References Cited

U.S. PATENT DOCUMENTS

| | | | | |
|---|---|---|---|---|
| 3,299,417 | A * | 1/1967 | Sibthorpe | 340/605 |
| 3,495,443 | A * | 2/1970 | Switzer et al. | 73/40.5 R |
| 3,726,319 | A * | 4/1973 | Patterson | 138/90 |
| 3,871,209 | A * | 3/1975 | Hasha | 73/49.1 |
| 4,182,158 | A * | 1/1980 | Culotta et al. | 73/40 |
| 4,259,553 | A | 3/1981 | Tanaka et al. | |
| 4,349,049 | A | 9/1982 | Silvey | |
| 4,450,711 | A | 5/1984 | Claude | |
| 5,654,499 | A | 8/1997 | Manuli | |
| 5,685,576 | A * | 11/1997 | Wolfe et al. | 285/148.8 |
| 5,918,641 | A * | 7/1999 | Hardy et al. | 138/132 |
| 6,032,699 | A * | 3/2000 | Cochran et al. | 138/104 |
| 6,374,863 | B1 * | 4/2002 | Friederich | 138/104 |
| 6,516,833 | B1 * | 2/2003 | Witz et al. | 138/135 |
| 6,634,387 | B1 | 10/2003 | Glejbøl | |
| 6,923,477 | B2 * | 8/2005 | Buon et al. | 138/109 |
| 6,926,039 | B2 | 8/2005 | Marion | 138/137 |
| 7,118,137 | B2 * | 10/2006 | Deremiah | 285/93 |
| 7,204,524 | B2 * | 4/2007 | Eccleston | 285/258 |
| 7,453,367 | B2 * | 11/2008 | Spaolonzi et al. | 340/605 |
| 2004/0066035 | A1 * | 4/2004 | Buon et al. | 285/222.2 |
| 2004/0177891 | A1 * | 9/2004 | Spaolonzi et al. | 138/104 |
| 2004/0245774 | A1 * | 12/2004 | Eccleston | 285/222.1 |
| 2005/0072215 | A1 * | 4/2005 | Booles | 73/40.5 R |
| 2007/0009329 | A1 * | 1/2007 | Chouest | 405/195.1 |
| 2011/0229271 | A1 * | 9/2011 | Clements | 405/224.2 |
| 2012/0000273 | A1 * | 1/2012 | Slack | 73/46 |

FOREIGN PATENT DOCUMENTS

| | | | |
|---|---|---|---|
| EP | 0695902 A1 | 2/1996 | |
| EP | 1460408 A1 | 9/2004 | |
| FR | 2545186 | 11/1984 | |
| GB | 1039515 | 8/1966 | |
| GB | 2099952 | 12/1982 | |
| GB | 2105434 | 3/1983 | |
| GB | 2117480 | 10/1983 | |
| GB | 2148447 A | 5/1985 | |
| WO | WO 2004027310 A1 * | 4/2004 | F17D 5/06 |
| WO | WO2007/024795 | 3/2007 | |

OTHER PUBLICATIONS

Guangcai, CN 1595089A human assisted machine translation to English, Mar. 16, 2005.*

Carneval, et al, "Flexible Line Inspection," ECNDT 2006—Poster 106, http://www.ndt.net/article/ecndt2006/poster~1.htm, Berlin, Sep. 25-29, 2006.*

International Preliminary Report on Patentability and Written Opinion of the International Searching Authority, mailed May 14, 2009, for corresponding International Application No. PCT/GB2007/003778.

International Search Report and Written Opinion of the International Searching Authority, mailed Jul. 22, 2008, for corresponding International Application No. PCT/GB2007/003778.

State Intellectual Property Office, P.R. China, First Office Action for corresponding Chinese Application No. 200780040880.3, dated Jan. 29, 2010, 18 pages.

English translation of Second Office Action from State Intellectual Property Office, P.R. China, for Chinese Patent Application No. 200780040880.3, dated Sep. 26, 2010, 19 pages.

UK Search Report, Application No. GB0621543.8, 5pp. (Aug. 2, 2007).

* cited by examiner

TESTING AND VENTING PIPE ANNULUS

CROSS REFERENCE TO RELATED APPLICATIONS

This is the U.S. National Stage of International Application No. PCT/GB2007/003778, filed Oct. 5, 2007, which in turn claims the benefit of and priority to Great Britain Application No. GB0621543.8, filed Oct. 30, 2006.

The present invention relates to a method and apparatus for testing and venting flexible pipe. In particular, but not exclusively, the present invention relates to the testing and/or venting of an inner annulus of flexible risers and flowlines. The testing enables the integrity of inner polymer layers to be proven whilst the venting prevents build-up of permeated gases so as to reduce risk of collapse.

Traditionally, flexible pipe is utilized to transport production fluids, such as oil and/or gas and/or water, from one location to another. Flexible pipe is particularly useful in connecting a sub-sea location to a sea level location. Flexible pipe is generally formed as an assembly of pipe body and one or more end fittings. The pipe body is typically formed as a composite of layered materials that form a pressure-containing conduit. The pipe structure allows large deflections without causing bending stresses that impair the pipe's functionality over its lifetime. The pipe body is generally built up as a composite structure including metallic and/or polymer layers.

Flexible pipe is usually formed as a single length of flexible pipe body terminated at each end with an end fitting. Alternatively, segments of flexible pipe body may be connected together in an end-to-end configuration with an end fitting at an end of one segment connected back-to-back with an end fitting of an adjacent segment. During operation transport fluids are transported along an inner bore. These transport fluids may contain, or themselves comprise, gas. If an inner barrier layer used to contain the fluids allows such gases to permeate or pass therethrough the gases can collect within the flexible pipe body. If these gases are not released their build-up can cause failure of the flexible pipe. Known techniques for venting such gases are unable to vent gases which collect in certain regions of the flexible pipe. Also, some known methodologies for venting involve costly and/or intricate end fittings to be used.

During the manufacture of flexible pipe body the layers of the flexible pipe are formed. Subsequent to manufacture, but prior to use, it is desirable to be able to test the integrity of one or more of these manufactured major layers. If an error occurs during manufacture or if a layer is damaged during production it is desirable to identify this prior to putting the flexible pipe body into use where its failure will be noted but will be time consuming and costly to replace. There are known techniques for testing the integrity of some layers of a flexible pipe body, however, these techniques are not able to successfully test the integrity of inner annular regions. Such annular regions are formed, for example, between an inner barrier layer used to define a bore of the flexible pipe and an inner seal layer which may be incorporated in the composite flexible pipe body so as to provide some protection should the barrier layer or an outer shield layer fail during use.

It is an aim of the present invention to at least partly mitigate the above-mentioned problems.

It is an aim of embodiments of the present invention to provide a method for testing the integrity of one or more layers of manufactured flexible pipe body.

It is an aim of embodiments of the present invention to provide a method for venting gases which collect within a portion of flexible pipe body.

It is an aim of embodiments of the present invention to provide an end fitting which can be used to terminate a portion of flexible pipe body and which includes vent and/or test passages via which testing and/or venting can be carried out.

According to a first aspect of the present invention there is provided a method of testing integrity of a portion of flexible pipe body, comprising the steps of:
via at least one port in an end fitting assembly in which an end of a portion of flexible pipe body is terminated, monitoring at least one parameter associated with an annulus region disposed between layers of said flexible pipe body, said annulus region being connected to said port by a connecting passageway.

According to a second aspect of the present invention there is provided a method of venting an annular region disposed between a barrier layer and an inner seal layer of a portion of flexible pipe body, comprising the steps of:
selectively opening an output port in an end fitting assembly in which an end of a portion of flexible pipe body is terminated, said output port being connected to the annular region via a passageway to thereby vent fluid from said annular region.

According to a third aspect of the present invention there is provided a flexible pipe, comprising:
a portion of flexible pipe body having an end terminated in an end fitting assembly;
at least one port in said end fitting assembly; and
at least one passageway connecting said port to an annulus region disposed between layers of said flexible pipe body; wherein
at least one parameter associated with the annulus can be monitored via said port.

Embodiments of the present invention allow the testing of the inner annulus of flexible risers and flowlines. This provides production personnel with the ability to test both a sealing arrangement and the integrity of polymer layers of the flexible pipe body as part of factory acceptance tests.

Embodiments of the present invention can be used to prove the integrity of inner polymer layers which are required to maintain a dry environment should an outer shield of a flexible pipe be breached.

Embodiments of the present invention provide the advantage that flexible pipe can be tested during final assembly and before final installation.

Embodiments of the present invention provide a manner in which vent valves on an outside of an end fitting can be used to vent gases and therefore prevent the build-up of permeated gases during use. This reduces the risk of collapsing the inner liner of the flexible pipe.

Figure 2:
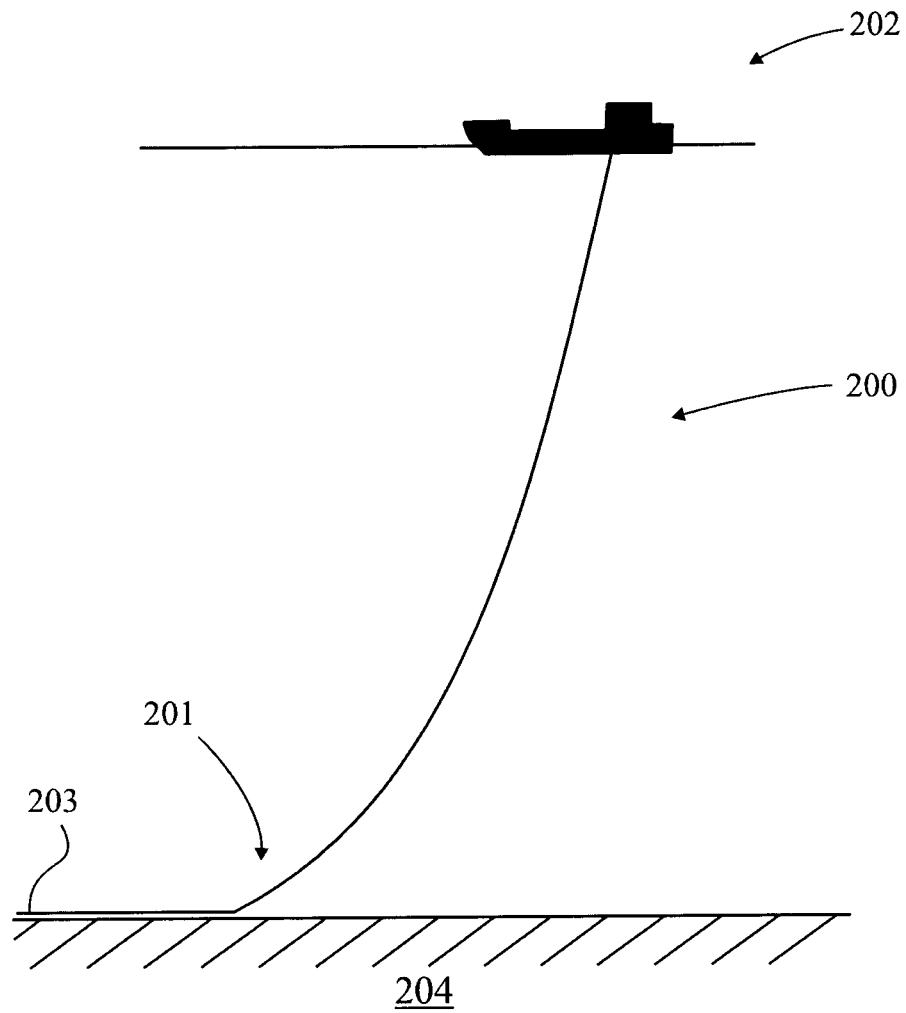
Figure 3:
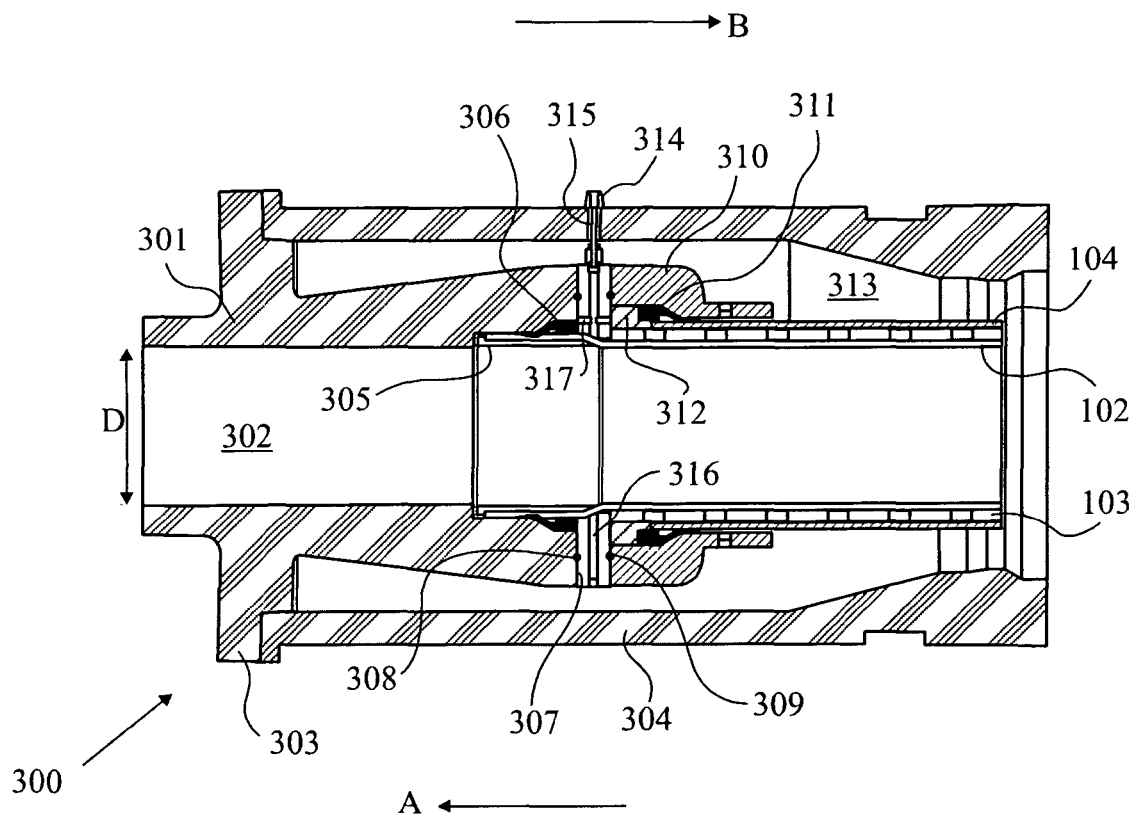
Figure 4:
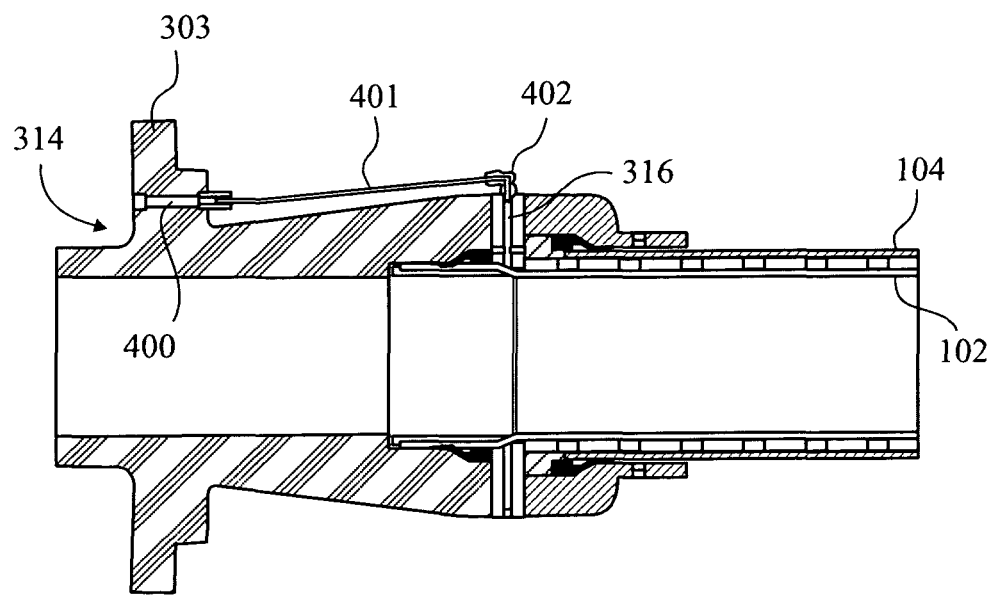
Figure 5:
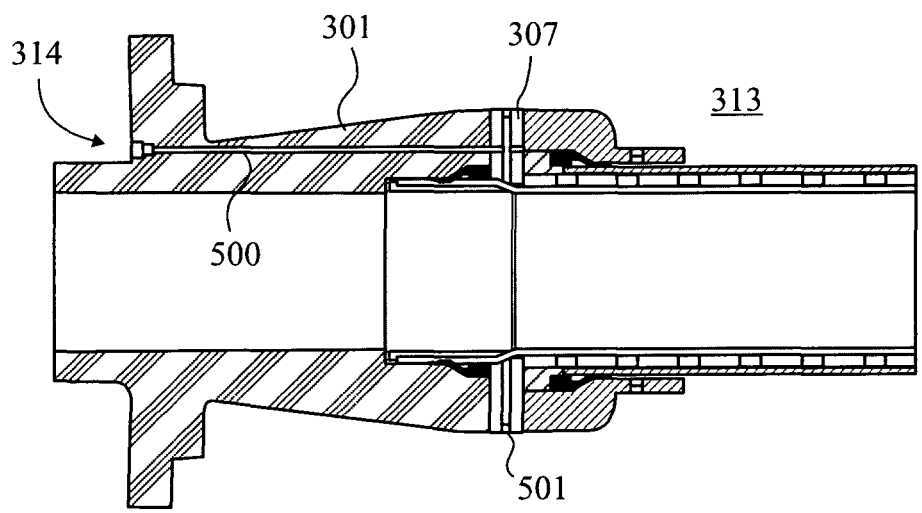
Figure 6:
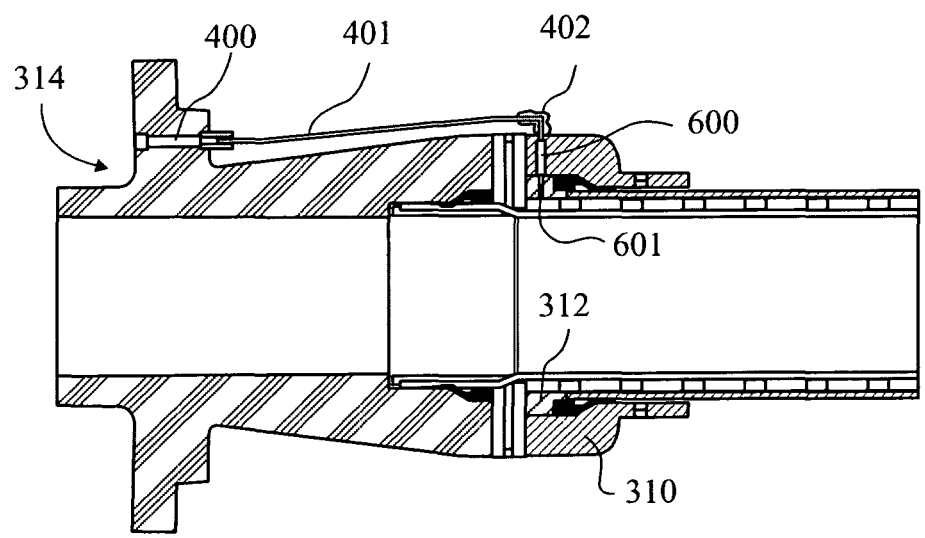
Figure 7:
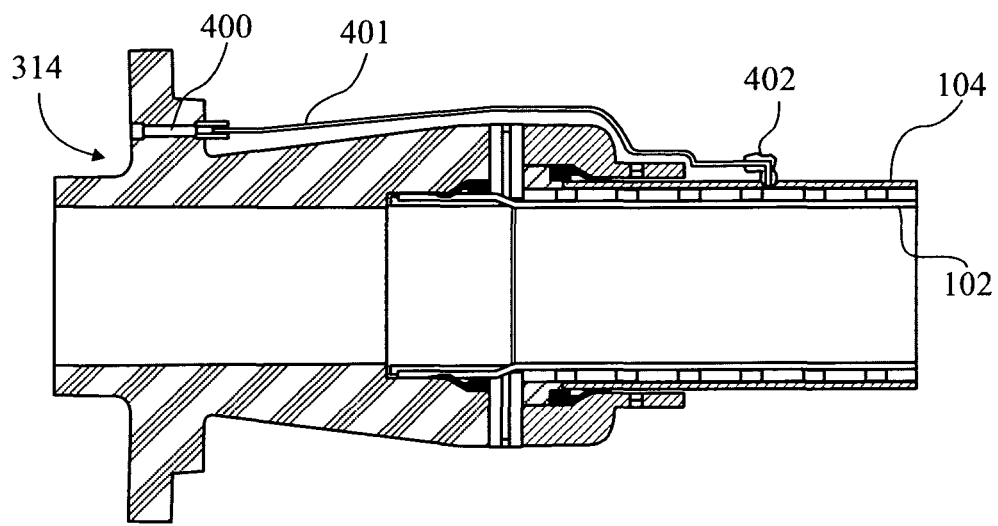
Figure 8:
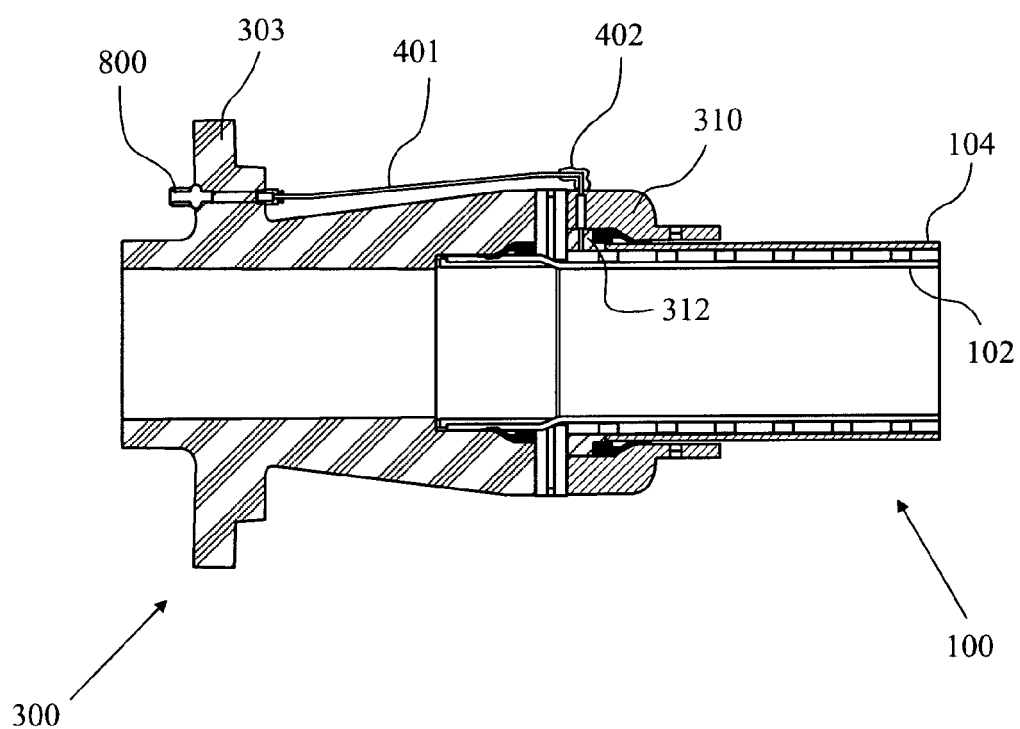

Embodiments of the present invention will now be described hereinafter, by way of example only, with reference to the accompanying drawings in which:

FIG. 1 illustrates layers in a segment of flexible pipe body;
FIG. 2 illustrates a catenary riser;
FIG. 3 illustrates flexible pipe body terminated in an end fitting;
FIG. 4 illustrates flexible pipe body terminated in an end fitting;
FIG. 5 illustrates flexible pipe body terminated in an end fitting;
FIG. 6 illustrates flexible pipe body terminated in an end fitting;
FIG. 7 illustrates flexible pipe body terminated in an end fitting; and FIG. 8 illustrates flexible pipe body terminated in an end fitting with a vent valve.

In the drawings like reference numerals refer to like parts.

Throughout this specification reference will be made to a flexible pipe. It will be understood that a flexible pipe is an assembly of a pipe body and one or more end fittings in each of which an end of the pipe body is terminated. FIG. 1 illustrates how a pipe body 100 is formed from a composite of layered materials that form a pressure-containing conduit. Although a number of particular layers are illustrated in FIG. 1, it is to be understood that the present invention is broadly applicable to composite pipe body structures including two or more layers.

As illustrated in FIG. 1, a pipe body typically includes an inner most pressure sheath 102. The internal pressure sheath 102 typically comprises a polymer layer that ensures internal-fluid integrity. It is to be understood that this barrier layer may itself comprise a number of sub-layers. It is also to be noted that embodiments of the present invention are preferably utilized with respect to "smooth bore" pipe body as shown in FIG. 1. It will, however, be understood that embodiments of the present invention are applicable to "rough bore" applications which include an inner carcass layer 101 (not shown).

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe 100 also includes at least one inner sealing layer 104. Such a layer is included to help contribute to collapse resistance. In addition such a layer can provide containment of the transport fluid if the barrier layer is breached. Also such a layer 104 can provide containment should an outer sheath (described further below) fail.

The flexible pipe body may also include a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe may also include one or more layers of tape 107 which can be used to retain layers of the flexible pipe body in a desired configuration.

The flexible pipe body may also include an outer sheath 108. The outer sheath is a polymer layer used to protect the pipe against penetration of seawater and other external environments, corrosion, abrasion and mechanical damage.

Each flexible pipe comprises at least one segment of pipe body 100 together with an end fitting located at at least one end. An end fitting provides a mechanical device which forms the transition between the flexible pipe body and a connector or further end fitting.

The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 203 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 3 illustrates how an end of a segment of flexible pipe body 100 may be terminated in an end fitting in accordance with an embodiment of the present invention. The end fitting 300 includes a generally cup shaped body 301 which has an axially extending inner bore 302 having an inner diameter d. The inner diameter preferably matches a corresponding inner diameter defined by an inner diameter of the barrier layer 102 of the segment of flexible pipe body to be terminated in the end fitting. The end fitting body 301 at a first end thereof defines an open mouth region in which a suitably cut end of flexible pipe body may be introduced during a termination process. A flange region 303 extends outwardly from the end fitting body and is located near a remaining end region of the end fitting body. An end fitting jacket 304 is secured to the flange region 303 by a suitable securing mechanism such as one or more bolts (not shown). The jacket houses various components of the end fitting and helps protect them.

Various layers of the composite flexible pipe body are cut at desired lengths prior to termination in the end fitting 300.

A barrier sleeve 305 is introduced into an open end of the flexible pipe body and acts to at least slightly flare out the open mouth of the flexible pipe body in the open mouth region of the end fitting 300. The sleeve may include one or more backwardly faced serrations to prevent movement of the barrier layer. An inner seal ring 306 is located in a generally tapered recess formed between an inner surface of the open mouth region of the end fitting and an outer surface of the end region of the barrier layer. The inner seal ring is a generally annular sealing member which preferably engages into an outer surface of the barrier layer 102 when the flexible pipe body is terminated in the end fitting.

An inner collar 307 is secured to an end of the open mouth region of the end fitting 300. During a termination process the securement of the inner collar onto the end fitting will drive the inner seal 306 in a direction indicated by arrow A in FIG. 3 into the tapered recess to provide a good seal. The inner collar is a substantially ring-like rigid structure although it will be appreciated that the ring may be formed in more than one part. An end-fitting-side O ring seal 308 and a flexible-pipe-side O ring seal 309 can be included to help provide a seal to prevent a leak path between the inner collar and end fitting and inner collar and an outer collar 310 respectively. The outer collar 310 is utilized by the Applicant/Assignee and marketed under the name Flexlok™ collar. The outer collar 310 may be secured to the end fitting via any suitable securing mechanism such as by bolting. The bolts pass through holes or gaps formed at suitable locations on the inner collar.

A middle seal ring 311 is located in a tapered recess defined between an inner surface of the outer collar 310 and an outer surface of an inner seal layer 104. The middle seal ring 311 is a generally annular structure which is urged into the recess by an associated spacer ring which acts as a drive ring 312. The ring is utilized by the Applicant/Assignee and marketed under the name Flexlok™ Ring. As the outer collar 310 is bolted to the inner collar 307 a surface of the drive ring 312 will contact a pipe-side surface of the inner collar 307. As the outer collar 310 is further secured a seal ring engaging surface of the drive ring 312 will contact a corresponding engagement surface of the seal ring which will then drive the middle seal ring 311 in a direction illustrated by arrow B in FIG. 3 so as to provide a seal between an outer surface of the sealing layer 104 and an inner surface of the outer collar 310.

Further layers of the flexible pipe body (not shown in FIG. 3) which lie radially outside the seal layer 104 are terminated at desired lengths and are located within a cavity 313 defined between an inner surface of the jacket 304 and the flexible pipe body 100 and end fitting 300. The cavity may be left empty or more preferably is filled by some resin material during a termination process to secure parts of the flexible pipe body in the end fitting.

It will be appreciated that the inner barrier layer 102 which is substantially cylindrical and the sealing layer 104 which is also substantially cylindrical and coaxial with the inner barrier layer 102 form between them an elongate annular region. This annular region contains the pressure armour layer 103 and, if the sealing layer 104 is provided at a different location in the composite pipe from that shown in FIG. 1, may include other layers of the flexible pipe body such as armour layers and tape layers.

Subsequent to the outer collar 310 and middle sealing ring 311 being secured in place, it is helpful to be able to test the integrity of this annular region. Such a test is desirable to check whether a good seal has been made between the outer collar 310 and outer surface of the seal layer 104. Such testing can also test the integrity of the seal layer 104 and barrier layer 102 to check whether either or both layers have a fault or hole which could cause failure of the pipe in use. Until now the testing of this inner annular region has been difficult/impossible to achieve.

In accordance with embodiments of the present invention this problem is overcome by providing a passageway formed between the inner annulus region and an outer surface of the end fitting. The passageway enables fluid, such as A test gas, to be introduced via an inlet port secured to the end fitting either on the end fitting body or jacket or some other convenient location. A passageway network from the inlet port links the port to the inner annulus so that fluid may be introduced into the annulus region. Subsequent to introduction of the fluid pumping is ceased and a pressure of the fluid is monitored. A drop in pressure or change in some other parameter associated with the test gas can be monitored and will indicate a breach in one of the inner barrier layer 102, inner seal layer 104 or inner seal ring 306 or middle seal ring 311. It is to be noted that the passageway between an inlet valve and the inner annulus region may be provided in a variety of ways some of which will now be described hereinafter.

As illustrated in FIG. 3, an inlet port 314 is formed in the jacket 304 of the end fitting 300. It will be understood that whilst the port 314 is described as an inlet port, it is equally possible to permit fluid, such as test gas, to exit the port 314 and as such the port may act as an inlet port only or an outlet port only or an inlet and outlet port. The port may include a suitable one way or two way valve depending upon its usage. The port 314 is connected to a coupling tube 315 which passes through a bore formed through the thickness of the jacket 304 and across the cavity 313 where it is connected to a radially extended through hole 316 which extends in a radial direction through the inner collar 307. It will be understood that the through hole 316 is preformed in the inner collar and that one, two or more such radially extending holes may be formed circumferentially around the collar. Preferably the inner collar includes three such bores spaced equally apart around the collar. Each through bore 316 provides a first flow path connecting the outside of the end fitting via port 314 to the inner annulus region formed between the seal layer 104 and barrier layer 102. The flow path is formed through the port 314, coupling tube 315 and through bore 316 and into the space between a radially inner surface of the inner collar 307 and an outer surface of the barrier layer 102. It will be understood that there will be a space between the inner collar and outer surface of the barrier layer. This space may be substantially filled with epoxy as part of the termination process but a fluid flow path will be provided since the epoxy, barrier layer and inner collar materials will not be perfectly sealed together.

As shown in FIG. 3, in addition to the through bore 316, cross drilled passageways may also be formed at a desired location from each of the through bores 316. Alternatively, it will be understood that the cross bores may be formed on only selected through bores or still further on only one of the through bore passages. As illustrated in FIG. 3, the cross bore is preformed as a through passageway extending in an axial direction through the inner collar and will be at least partially aligned with the through bore 316 so that a fluid communicating passage is formed. One part of the cross bore 317 extends in the direction of arrow A in FIG. 3 and this bore terminates at the interface between the inner collar 307 and the end surface of the open mouth region of the end fitting body 303. This coincides with the interface between the inner collar 307 and a drive end of the inner seal 306. It is to be noted that this interface is not sealed and therefore test gas or other such fluid introduced through port 314 will permeate through the interface region into the inner annulus region.

A portion of the cross bore 317 which extends in the direction B shown in FIG. 3 connects the test port 314 to the interface between the inner collar 307 and the outer collar 310 and drive ring 312. Again this interface is not sealed and therefore test gas introduced via the port 314 will permeate through the interface into the inner annulus region.

It will be understood that in embodiments which utilize O rings 308, 309 to seal the surfaces of the inner collar 307 to the end fitting 301 and outer collar 310 respectively, the cross bores 317 should be formed radially inwardly of the locations of the O rings.

The embodiment illustrated in FIG. 3 thus illustrates, by way of example only, three locations where test gas introduced at port 314 may enter the inner annulus region. These three regions are at the interface between the inner collar and the end fitting body, the interface between the inner collar and the outer surface of the barrier layer 102 and the interface between the inner collar and the drive ring 312/outer collar 310. It will be appreciated by those skilled in the art that embodiments of the present invention can use only one or two or all three of these possible pathways. It will be appreciated that if less than all of the pathways are required then the passageway 316, described as a through bore, could in fact be a blind passage merely linking one or two cross bores to a respective interface region. As such the passageway could be substantially L-shaped if only one interface was required or T-shaped if two interface regions are required or, as shown in FIG. 3, cross-shaped where three interface areas are required. It will also be appreciated by those skilled in the art that should a greater degree of connection be desired between the port 314 and the inner annulus more than one cross bore could be provided off each radially extended passageway 316. A larger number of such radially extending passageways could optionally also be used.

FIG. 4 illustrates a further embodiment of the present invention. It is to be noted that the jacket 304 surrounding the end fitting is not shown in FIG. 4 for the sake of clarity. As illustrated in FIG. 4 a communication passageway linking the outside of the end fitting to the inner annulus region includes a port 314 formed in the flange 303 of the end fitting body 301. The port 314 is connected to a passageway 400 extending in an axial direction through the flange of the end fitting body.

The passageway 400 is connected to a coupling tube 401 which extends in a substantially axial direction to a dog-leg connector 402 into a through bore 316. In this way fluid, such as a test gas, introduced via the port 314 passes along the passageway 400 and connecting tube 401 and connector 402 into the passageway 316 where it may enter the inner annulus between the barrier layer 102 and inner seal layer 104. As noted above subsequent to pumping test gas into the annulus a parameter such as pressure within the annulus may be monitored to determine whether seals are effective and/or whether one or more of the fluid containing layers is breached.

It is to be appreciated that the testing process may be carried out according to a variety of possible methodologies. For example, as described above, it is possible to pump a test gas, such as nitrogen, dry air or others into the annulus region via a test port, terminate pumping and then monitor a fall off in a parameter such as pressure associated with the annulus. As an alternative, a pumping rate of the test gas may be known and results may be compared against pre-known test results. If a parameter such as time taken exceeds a predetermined threshold before a further parameter such as pressure associated with the annulus is reached, this will indicate that a seal is ineffective or imperfect or that a barrier layer or seal layer is at least partially or fully breached in at least one location. It will be appreciated by those skilled in the art that such testing can occur prior to the flexible pipe being put to work at a field location. Errors/flaws associated with the flexible pipe and/or end fitting can thus be established and corrected prior to putting the flexible pipe into use. Subsequent to putting a flexible pipe into use observation of a failing is costly to put right since the flexible pipe must be recovered and then the flaw/error corrected.

FIG. 5 illustrates a further embodiment of the present invention in which a fluid communicating passageway is formed between an inlet port 314 and an inner annulus region by virtue of one or more preformed passageways through the end fitting body 301. The passageway 500 connects the inlet port 314 to a cross bore formed in the inner collar 307. It will be appreciated that a cap 501 may be included to prevent outgress of test fluid into the cavity region 313 between the end fitting body and jacket (not shown). Alternatively the bore in the inner collar can be formed as a blind hole so that a bore is not formed through the whole radial thickness of the inner collar. An advantage of the embodiment shown in FIG. 5 is that very few threaded connections which may provide leak paths are utilized.

FIG. 6 illustrates an alternative embodiment of the present invention which shares many similar features to the embodiment illustrated with respect to FIG. 4. However, in the FIG. 6 embodiment, the coupling tube 401 is connected to a dog-leg connector 402 which is itself connected to a through bore 600 formed in the collar 310. A communication passage from the port 314 to the inner annulus is completed by providing a bore 601 through the drive ring 312. In this way a fluid such as a test gas can flow from the port 314 through the flange 303 of the end fitting body 301 via a coupling tube 401 and connector 402 through the passage 600 formed in the collar 310 and a passage 601 formed in the drive ring. It will be understood that bores through the inner collar 307 are superfluous in this embodiment and may be avoided entirely if so desired.

FIG. 7 illustrates a further embodiment of the present invention in which a fluid communicating passageway is formed between a port 314 on the end fitting and an inner annulus region of flexible pipe body. The port 314 is connected to a coupling tube 401 by an axial bore 400 formed through a flange 303 of the end fitting body. The coupling tube 401 is connected to this bore at a first end thereof. At a further end of the coupling tube 401 is a connector 402 which is secured to the seal layer 104 of the flexible pipe body. A passageway hole is formed in the seal layer 104 to connect the annulus region between the seal layer 104 and barrier layer 102 to the port 314 by the communication passageway. It will be appreciated in this embodiment of the present invention that communication passageways need not be formed in the inner collar 307 or collar 310 or drive ring 312.

Whilst the above-identified embodiments have been described by way of example with reference to the testing of the integrity of an annular region of a flexible pipe, it will be appreciated that the embodiments are equally applicable and additionally applicable to the venting of the same annular region. In order to carry out such a venting process, a valve may be secured to the port 314. By way of example FIG. 8 illustrates the embodiment earlier described with respect to FIG. 6 incorporating the vent valve 800. It will be appreciated that a vent valve 800 could be applied to any of the embodiments described hereinabove to enable those embodiments to be utilized for venting gases which build up in the annular region. It will be appreciated by those skilled in the art that from time to time gas which either comprises the transport fluid or which is suspended in such a fluid will permeate through the inner barrier layer 102 in the flexible pipe body and will tend to accumulate in an inner annulus region formed between this inner barrier layer and an internal seal layer 104. The accumulation of such gases is known to cause problems from time to time and can cause failure of the flexible pipe body. It will be appreciated that correcting such failures is a time-consuming and costly process. Techniques for venting annular regions in flexible pipe body have been proposed but until now no such venting technique has been provided to vent the annular region between an inner barrier layer and an inner seal layer. Most venting techniques have been utilized to vent regions radially outward of an inner seal layer or have been applicable only to flexible pipe body which does not utilize an inner seal layer. It will be appreciated that in much the same way that embodiments of the present invention provide a manner in which an integrity of this inner annulus region can be verified prior to use, it is also possible to use the passageways provided for such testing during use to individually vent segments of flexible pipe body.

Referring to FIG. 8, it is to be noted that an end region of a segment of flexible pipe body 100 is illustrated terminated in an end fitting 300. The end fitting 300 will in practice include an end fitting jacket 304 which is not shown in FIG. 8 for the sake of clarity. Once the integrity of such a flexible pipe has been verified the pipe will be put into operation and will be utilized to convey transport fluids from one location to another. During use gases can collect in the inner annular region between the inner barrier layer 102 and inner seal layer 104 as described hereinabove. Therefore, from time to time authorized personnel can be given access to the end fittings in the flexible pipe. By opening a valve 800 at a desired time gases which have collected in the inner annulus region can be removed. The gases will flow along the communication passage which, in the FIG. 8 embodiment, is formed by a bore formed through the drive ring 312 and bore formed through the collar 310. The bore through the collar 310 is connected to a connector 402 and to a coupling tube 401 connecting the connector 402 to a bore formed through the flange 303 of the end fitting body 301. The accumulated gas may vent by virtue of an internal pressure being higher than a pressure downstream of the vent 800. It will be appreciated that a pump may be utilized to pump out accumulated gas via the communication passageway and valve 800 to speed up the process and minimize an amount of accumulated gas remaining in the annulus region subsequent to venting. When all accumulated gas or a proportion of accumulated gas has been vented the valve 800 can be closed so as to prevent ingress of gas or fluid, such as seawater, into the communication passageways and through these into the annulus region.

Embodiments of the present invention allow the testing of an inner annulus of flexible risers and flowlines. Production personnel thus are provided with the ability to test both the sealing arrangement and polymer layers of the flexible pipes as part of factory acceptance tests. Embodiments of the present invention prove the integrity of the inner polymer layers which are required to maintain a dry environment should the outer shield of the flexible pipe be breached. An advantage of this method is that the pipe can be tested during final assembly and before final installation. The annulus testing system is connected to the flexible pipe and the outside via airline connection and air hoses which allow either the annulus to be pressurized or evacuated depending upon whether the bore of the pipe is filled with water or is at atmospheric pressure.

The installation of vent valves on the outside of the end fitting after test also allows the system to be vented during operation. This prevents the build up of permeated gases and reduces the risk of collapsing the inner liner of the flexible pipe.

It will be appreciated that embodiments of the present invention can provide a method and apparatus suitable for venting an inner annulus region of flexible pipe body without the need to test the annulus prior to use.

According to certain embodiments of the present invention, when an annulus region between the barrier layer and inner seal of flexible pipe body is to be tested the inner bore of the flexible pipe body can be substantially filled with fluid, such as water, prior to testing. This will help counter the pressure effect caused by the introduction of test fluid into the annular region during the integrity test.

Embodiments of the present invention above-described can be modified to help increase the flow path of fluid introduced through port 314 or vented out through port 314 during a testing or venting process. For example, an inner surface region of the collar 307 which contacts an outer surface of the barrier layer 102 can include one or more channels. Alternatively, the drive ring 312 may include one or more channels at a collar engaging surface so that the interface between the drive ring and the collar 307 includes gaps through which gas/test fluid can percolate. Similar channels may be formed on any one of the features where such an interface occurs. The channels may be preformed or may be formed by providing one or more rough engaging surfaces.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of testing integrity of a portion of flexible pipe body for transporting production fluids from a sub-sea location, prior to installation and use comprising the steps of:

providing a flexible pipe body that is suitable for forming a riser or flowline formed as a composite structure of layered materials, the layers including an internal polymer sheath, a pressure armour layer, and an inner sealing layer, via at least one port in an end fitting assembly in which an end of a portion of flexible pipe body is terminated, introducing test fluid under pressure at said port, ceasing the introduction of test fluid at said port, monitoring at least one parameter associated with an annulus region disposed between an outer surface of the internal polymer sheath and an inner surface of the inner sealing layer of said flexible pipe body where the inner surface of the inner sealing layer is spaced radially outwardly from and extends co-axially over the outer surface of the internal polymer sheath, said annulus region being connected to said port by a connecting passageway, and evacuating the test fluid prior to installation and use of the flexible pipe body.

2. The method as claimed in claim 1, further comprising the steps of:

providing a passageway from said port to an annulus region disposed between a barrier layer and the inner sealing layer of said flexible pipe body.

3. The method as claimed in claim 2 wherein said step of providing a passageway further comprises the steps of:

providing a coupling tube member connecting said port to an inner collar member arranged in said end fitting assembly;

providing a passageway section through said inner collar member from said coupling tube member to an inner drive ring member disposed between said inner collar member and said annulus; and providing a passageway section through said inner drive ring member to said annulus.

4. The method as claimed in claim 1, further comprising the steps of:

prior to testing, substantially filling a central bore of the flexible pipe body with a fluid.

5. The method as claimed in claim 1, wherein said method comprises testing the structural integrity of one or more layers of said flexible pipe body.

6. The method as claimed in claim 1, wherein said method comprises testing the integrity of one or more seal members disposed at an end region of said flexible pipe body.

7. The method as claimed in claim 1, further comprising the steps of:

introducing fluid under pressure at said port; and monitoring pressure of the fluid.

8. A method as claimed in claim 1, further comprising the steps of:

at least partially evacuating the annulus via the port; and monitoring pressure in the annulus.

9. The method as claimed in claim 1 wherein said step of providing a passageway further comprises the steps of:

providing a coupling tube member connecting said port to an inner collar member arranged in said end fitting; and providing a passageway section through said inner collar member from said tube member to said annulus.

10. The method as claimed in claim 1 wherein said step of providing a passageway further comprises the steps of:

providing a bore passage from said port through said end fitting assembly to an inner collar member arranged in said end fitting assembly; and providing a passageway section through said inner collar member from said bore passage to said annulus.

11. The method as claimed in claim 1 wherein said step of providing a passageway further comprises the steps of:

providing a coupling tube member connecting said port to a connector element provided at a predetermined location of a seal layer of said flexible pipe body.

12. The method as claimed in claim 1, further comprising the steps of:

selectively opening the port in the end fitting assembly to thereby vent fluid from said annulus region.

13. The method as claimed in claim 1, wherein the pressure armour layer is disposed in the annulus region.

* * * * *